United States Patent
Noda (10) Patent No.: US 6,293,714 B2
(45) Date of Patent: *Sep. 25, 2001

(54) PRINT PROCESSING METHOD AND APPARATUS AND STORAGE MEDIUM STORING PROGRAM CODES FOR EXECUTING ITS METHOD THEREIN

(75) Inventor: Akihiko Noda, Hino (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/139,398

(22) Filed: Aug. 25, 1998

(30) Foreign Application Priority Data

Aug. 27, 1997 (JP) ...................................... 9-230164

(51) Int. Cl.$^7$ ................................. B41J 5/30; B41J 11/44
(52) U.S. Cl. ................................. 400/61; 400/76; 400/70
(58) Field of Search ................................. 400/61, 76, 70; 395/112–119; 271/298; 399/82, 83; 358/296, 404

(56) References Cited

U.S. PATENT DOCUMENTS

| | | | | |
|---|---|---|---|---|
| 5,087,979 | * | 2/1992 | Schaertel | 358/296 |
| 5,640,250 | * | 6/1997 | Yoshida | 358/468 |
| 5,735,202 | * | 4/1998 | Sakakibara et al. | 101/2 |
| 5,798,843 | * | 8/1998 | Yamamoto et al. | 358/404 |
| 5,806,842 | * | 9/1998 | Steinhilber et al. | 270/58.08 |

FOREIGN PATENT DOCUMENTS 11-027448 * 1/1999 (JP).

* cited by examiner

Primary Examiner—John S. Hilten
Assistant Examiner—Charles H. Nolan, Jr.
(74) Attorney, Agent, or Firm—Fitzpatrick, Cella, Harper & Scinto

(57) ABSTRACT

Print data is stored into a spool device and a predetermined number of copies are printed. A size (ADsize) of print data is compared with a memory capacity (SDsize) of the spool device. When the size of print data exceeds a capacity of the spool device, the print data is divided into a plurality of print jobs on a page unit basis so that the print data lies within the memory capacity. The number of copies is designated for each of the divided print jobs, the print jobs are sequentially stored into the spool device, and the designated number of copies of each print job are printed, respectively.

21 Claims, 8 Drawing Sheets

PAGE 8 TO PAGE 10
PAGE 1 TO PAGE 7
PAGE 1 TO PAGE 10
(FOR FIRST COPY)

PAGE 8 TO PAGE 10
PAGE 1 TO PAGE 7
PAGE 1 TO PAGE 10
(FOR SECOND COPY)

PAGE 1 TO PAGE 10
(FOR THIRD COPY)

FIG. 9

| PAGE(S) | 1 | 2 | 3 | 4 | 5 | 6 | 7 | 8 | 9 | 10 |
|---|---|---|---|---|---|---|---|---|---|---|
| SIZE (KB) | 80 | 90 | 130 | 70 | 140 | 80 | 110 | 80 | 130 | 90 |

FIG. 10

| DIVISION JOB LIST | JOB NAME | PAGE(S) | SIZE (KB) |
|---|---|---|---|
| 1 | JOB-01 | 1 TO 7 | 700 |
| 2 | JOB-02 | 8 TO 10 | 300 |

FIG. 11

| DIVISION JOB COPY NO. | NO. OF COPIES IN DIVISION JOB |
|---|---|
| 1 | 3 |
| 2 | 2 |

FIG. 12

| JOB NAME | PAGE(S) | SIZE (KB) | NO. OF COPIES |
|---|---|---|---|
| JOB-01 | 1 TO 7 | 700 | 3 |
| JOB-02 | 8 TO 10 | 300 | 3 |
| JOB-01 | 1 TO 7 | 700 | 2 |
| JOB-02 | 8 TO 10 | 300 | 2 |

FIG. 13

| DIVISION JOB LIST | JOB NAME | PAGE(S) | SIZE (KB) |
|---|---|---|---|
| 1 | JOB-01 | 1 TO 7 | 700 |
| 2 | JOB-02 | 8 TO 10 | 300 |
| 3 | JOB-02 | 8 TO 10 | 300 |
| 4 | JOB-02 | 8 TO 10 | 300 |
| 5 | JOB-02 | 8 TO 10 | 300 |
| 6 | JOB-02 | 8 TO 10 | 300 |

FIG. 14

| DIVISION JOB COPY NO. | NO. OF COPIES IN DIVISION JOB |
|---|---|
| 1 | 1 |

FIG. 15

| JOB NAME | PAGE(S) | SIZE (KB) | NO. OF COPIES |
|---|---|---|---|
| JOB-01 | 1 TO 7 | 700 | 1 |
| JOB-02 | 8 TO 10 | 300 | 1 |
| JOB-02 | 8 TO 10 | 300 | 1 |
| JOB-02 | 8 TO 10 | 300 | 1 |
| JOB-02 | 8 TO 10 | 300 | 1 |
| JOB-02 | 8 TO 10 | 300 | 1 |

PRINT PROCESSING METHOD AND APPARATUS AND STORAGE MEDIUM STORING PROGRAM CODES FOR EXECUTING ITS METHOD THEREIN

BACKGROUND OF THE INVENTION

1. Field of the Invention

The present invention relates to print processing method and apparatus and, more particularly, to print processing method and apparatus for storing print data into a spool device, designating the number of copies, and printing. The invention further relates to a storage medium in which program codes to execute the print processing method have been stored.

2. Related Background Art

In the recent information oriented age, since a necessity to process a large amount of information occurs, it is required to reduce the processing time. For this purpose, even in a printing system, a countermeasure such as installation of a spool device, use of a plurality of sheet ejection ports, or the like is taken.

Figure 4:
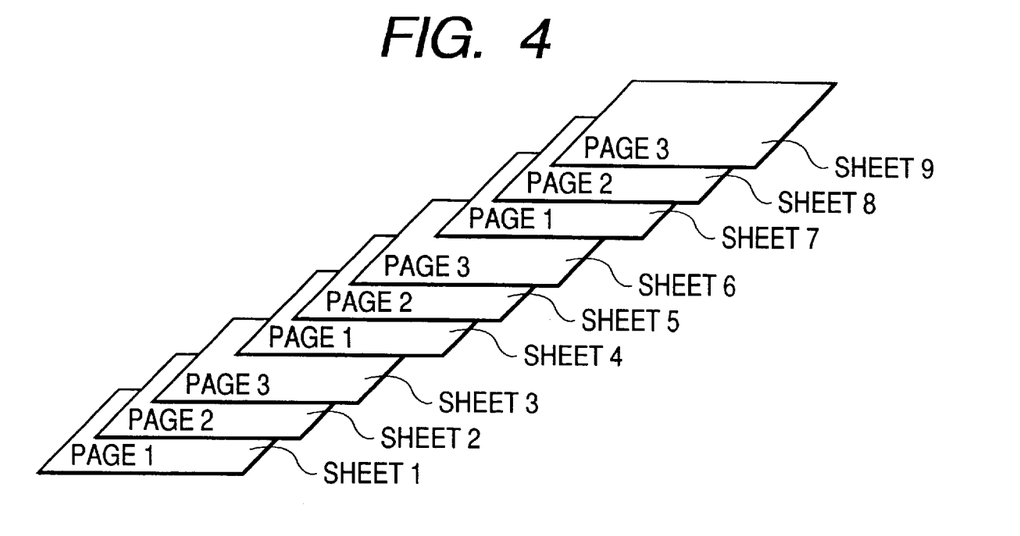
FIG. 4 is a diagram showing an output state of sheets in case of performing a printing process without using a spool device.

Hitherto, in case of printing a plurality of copies of data of a plurality of pages to a print output apparatus (printer) by using an information processing system (host), the print data is transferred to the printer only the number of times as many as the designated number of copies. For example, in case of outputting three copies of a document of three pages, as shown in FIG. 4, the data of pages 1 to 3 is transferred from the host to the printer three times, thereby printing a predetermined number of copies of the print data. However, in the case where a size of data of pages 1 to 3 is equal to 100 kB (kilobytes), in order to realize an output of a copy unit as shown in FIG. 4, the data of total 300 kB is transferred, so that it takes a printing time and an efficiency is low.

To raise a printing efficiency by improving it, hitherto, a spool device to store the print data is provided for the printer, the data of, for example, pages 1 to 3 is once transferred from the host, and the printer uses the data stored in the spool device a plurality of number of times (three times in the example of FIG. 4), thereby realizing the output of the copy unit.

Figure 5:
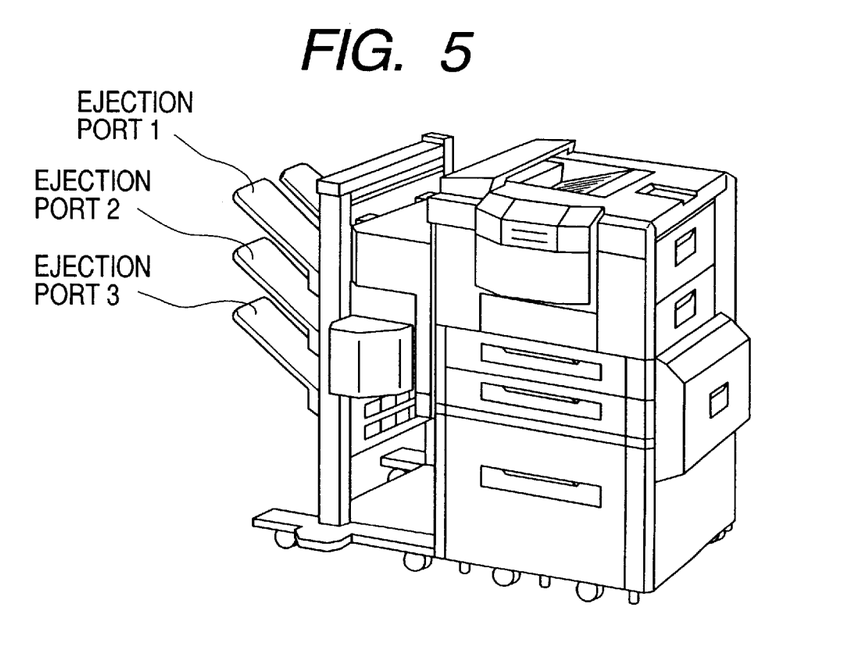
FIG. 5 is a perspective view showing an external appearance of the printer according to the first embodiment of the invention.

An information processing and the making of a document in the host are prevailing and it is demanded to print a large quantity of copies. In the printer, therefore, as shown in FIG. 5, a construction in which a plurality of paper feed ports and a plurality of sheet ejection ports are provided and the installation of the spool device are being progressed so that a large number of sheets can be handled. To effectively use the printing process of the copy unit in such a printer, it is insufficient to use only the conventional technique.

For example, in the case where the data to be outputted on a copy unit basis corresponds to tens of pages and its data size is equal to, for example, 1 MB (megabytes) and exceeds a capacity (for instance, 750 kB) of the spool device of the printer, there is a problem such that the technique to use the spool device of the conventional printer cannot be used. Although the effect of the technique to use the spool device is more exhibited as the size of data to be printed to a plurality of copies is larger, there is a drawback such that if the data whose capacity exceeds the capacity of the spool device even by a few bytes is outputted, the spool device cannot be used and an output time is long.

SUMMARY OF THE INVENTION

The invention is made to solve the above problems and it is, therefore, an object of the invention to provide print processing method and apparatus which can utilize a spool device and can improve a printing process.

According to the invention, there are provided print processing method and apparatus for storing print data to a spool device of a printer and printing a predetermined number of copies, wherein when the print data exceeds a storage capacity of the spool device, the print data is divided into a plurality of print jobs on a page unit basis so that it lies within the storage capacity. The number of copies is designated for each of the divided print jobs, the print jobs are sequentially stored into the spool device, and the designated number of copies are printed.

With such a construction, even if the print data exceeds the capacity of the spool device, the print data is divided into a plurality of jobs and is printed by the designated number of copies, respectively. Therefore, even in the print data of a large size, a predetermined number of copies can be efficiently printed by using the spool device.

When the predetermined number of copies exceeds the number of sheet ejection ports of the printer, the predetermined number of copies are divided into a plural number on the basis of the number of sheet ejection ports and the printing of the designated number of copies of each print job is repeated by the dividing number of times. For example, when there are three sheet ejection ports of the printer and five copies of the print data are printed, the printing of five copies is divided into the printing of two times corresponding to three copies and two copies, and the printing of each job is executed the number of times corresponding to the designated number of copies. With this method, the printing can be efficiently performed in consideration of the number of sheet ejection ports.

When the print data is divided into a plurality of print jobs, only the first print job is stored into the spool device and the other print jobs are printed without passing through the spool device. This process is repeated the number of times corresponding to the predetermined number of copies and the predetermined number of copies of the print data are printed. In this case, after all of the divided print data was printed, the next copy is printed, so that a binding process can be performed.

DETAILED DESCRIPTION OF THE PREFERRED EMBODIMENTS

Embodiments of the present invention will now be described in detail hereinbelow with reference to the drawings.

[First Embodiment]

Figure 1:
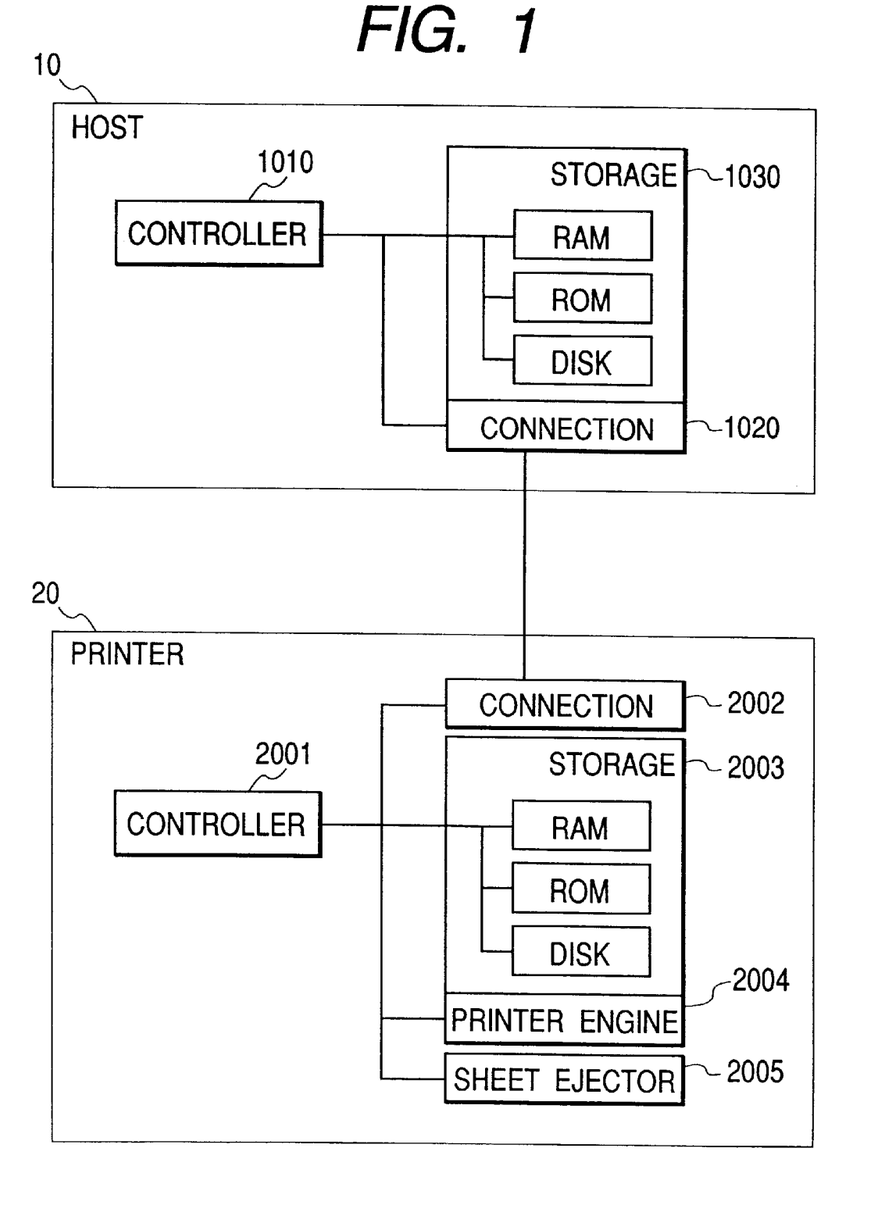
FIG. 1 is a block diagram showing a construction of a computer system to which a printing process is applied according to the invention.

FIG. 1 shows a construction of an information processing system to which a printing process of the invention is applied. The information processing system is mainly constructed by a host computer 10 and a printer 20. The host computer 10 is constructed by a controller 1010, a connection 1020, and a storage 1030. The printer 20 is constructed by a controller 2001, a connection 2002, a storage 2003, a printer engine 2004, and a sheet ejector 2005.

The controller 1010 of the host controls the printing process and instructs the printing process to the printer 20. The connection 1020 of the host is connected to the connection 2002 of the printer 20 by an interface for transmitting and receiving information to/from the printer 20.

The storage 1030 of the host comprises: a disk device to store print data; an ROM to store a print processing procedure; and an RAM to store the number of copies of the print data, the number of sheet ejection ports of the printer, various information which is determined from the print data, and the other data.

The controller 2001 of the printer analyzes information transferred from the controller of the host and controls the printing process. The storage 2003 is made up of an RAM, an ROM, and a disk device. A partial spool device (hereinafter, referred to as a spool RAM) is set into the RAM. The print data is printed by the printer engine 2004 under the control of the controller 2001 and is outputted to the outside through the sheet ejector 2005.

Figure 2:
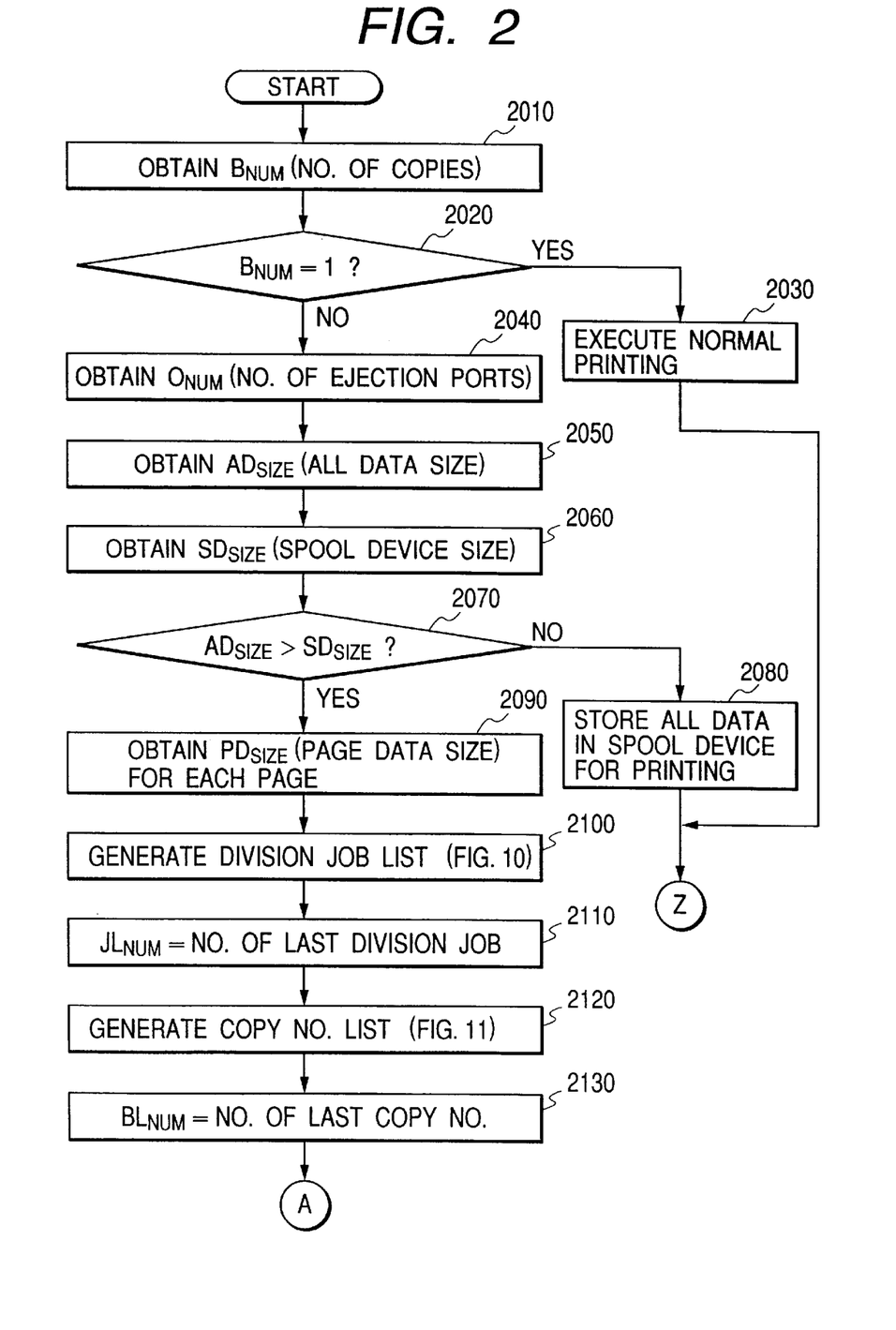
FIG. 2 is a flowchart showing a print processing procedure which is executed in a host computer and a printer in the first embodiment of the invention.
Figure 3:
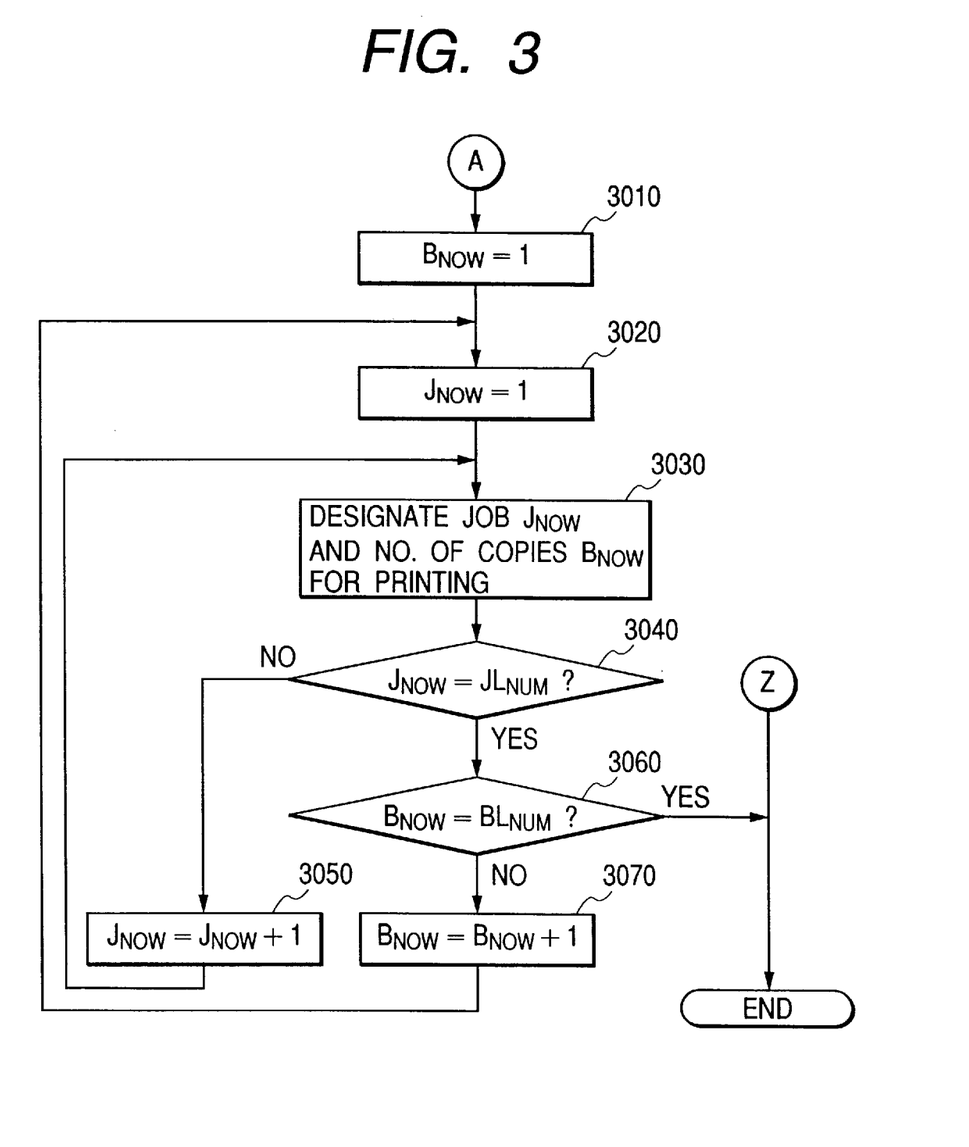
FIG. 3 is a flowchart showing a print processing procedure which is executed in a host computer and a printer in the first embodiment of the invention.

In the above construction, the print processing procedure will now be described with reference to FIGS. 2 and 3. In this case, modules (steps 2010 to 2130 and steps 3010 to 3070) of the invention have been stored in the ROM of the storage 1030 of the host in FIG. 1. Upon activation of the host, those modules are read into the RAM of the storage 1030 of the host.

It is assumed that information of the number (Onum) of sheet ejection ports of the printer as a target has been stored in the RAM of the storage 1030 of the host and the print data has been stored in the disk device of the storage 1030 of the host. Further, it is assumed that as shown in FIG. 5, the printer has three sheet ejection ports, a part of the RAM of the storage 2003 of the printer in FIG. 1 has been set as a spool device of a capacity of 750 kB, and this information has been stored in the RAM of the storage 1030 of the host.

A procedure for printing five copies of the data of 10 pages corresponding to a size of 1 MB (Megabytes) on a copy unit basis will now be described as an example on the assumption of the above principle as a prerequisite.

First, the controller 1010 of the host obtains information of the designated number of copies from the print data stored in the disk device of the storage 1030, sets its value into Bnum, and stores into the RAM of the storage 1030 of the host (step 2010). Since five copies of the print document are printed here, Bnum=5.

The controller 1010 of the host discriminates whether Bnum=1 or not (step 2020). When Bnum=1, since it is necessary to print only one copy of the print document, the copy number printing mode is not set and the normal printing process which does not use the spool device is performed (step 2030). The printing operation is finished.

Since Bnum=5 at present, namely, since a plurality of copies of the print document are printed, the controller 1010 of the host in FIG. 1 obtains information indicative of the number of sheet ejection ports of the printer in FIG. 5 from the RAM of the storage 1030 of the host, sets its value into Onum, and stores into the RAM of the storage 1030 of the host in FIG. 1 (step 2040). Since there are three sheet ejection ports of the printer here, Onum=3. Although the number of sheet ejection ports is stored together with a printer driver which is used, it can be also stored by an inputting operation of the user. However, preferably, the number of sheet ejection ports obtained by preliminarily inquiring to the printer from the host can be also stored in the RAM. Or, in the case where there are the sheet ejection ports in which a state where it is filled with the sheets is detected, the number of filled sheet ejection ports can be also subtracted from the total number of sheet ejection ports. That is, the number of available sheet ejection ports is inquired from the host to the printer and the number of sheet ejection ports which can be used can be also set as Onum on the basis of an answer of the inquiry.

The controller 1010 of the host subsequently obtains the information of the size of all data from the print data stored in the disk device of the storage 1030 of the host, sets its value into ADsize, and stores into the RAM of the storage 1030 of the host (step 2050). Since the size of all data is equal to 1 MB here, ADsize=1 MB.

The controller 1010 of the host obtains the information of the capacity (size) of the spool RAM stored in the RAM of the storage 2003 of the printer, sets its value into SDsize, and stores into the RAM of the storage 1030 of the host in FIG. 1 (step 2060). Since the capacity of the spool device is now equal to 750 kB (kilobytes), SDsize=750 kB.

The controller 1010 of the host subsequently discriminates whether ADsize as a size of all data is larger than or equal to the capacity of the spool RAM or not (step 2070). That is, a check is made to see if all of the print data can be stored into the spool RAM. When the size of all data is smaller than the capacity of the spool RAM, the controller 1010 of the host adds information for instructing to store all data into the spool RAM and to execute the printing process to the data and transfers all of the data to the controller 2001 of the printer through the connection 1020 of the host and the connection 2002 of the printer.

The controller 2001 of the printer analyzes the information received from the controller 1010 of the host and stores all data into the spool RAM set in the RAM of the storage 2003. The controller 2001 of the printer repetitively executes the printing process only the number of times corresponding to the designated number of copies by using the data stored in the spool RAM (step 2080).

Figure 9:
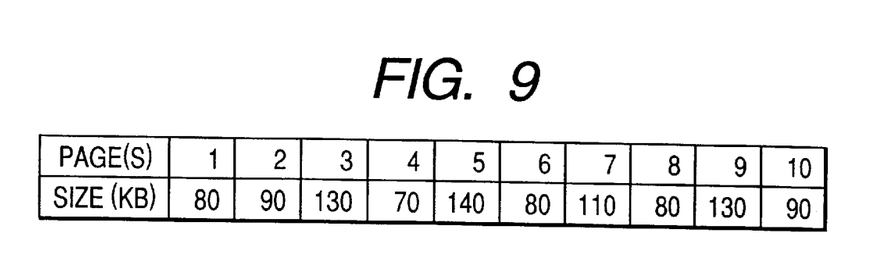
FIG. 9 is a table showing a page size list which is formed in the first embodiment of the invention.

On the other hand, in the case where ADsize=1 MB, SDsize=750 kB, the size of all data is larger than the capacity of the spool RAM, and all data cannot be stored all together into the spool RAM as in case of the embodiment, the controller 1010 of the host obtains the information of a size PDsize of each page from the print data stored in the disk device of the storage 1030 of the host, makes a page size list as shown in FIG. 9, and stores into the RAM of the storage 1030 of the host in FIG. 1 (step 2090).

Figure 10:
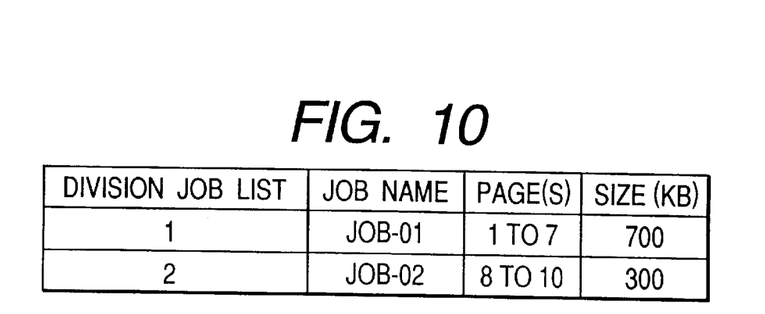
FIG. 10 is a table showing a division job list which is formed in the first embodiment of the invention.

Subsequently, the controller 1010 of the host divides the data into a plurality of jobs on a page unit basis so that it can lie within the SDsize on the basis of the information of the page size list stored in the RAM of the storage 1030 of the host in FIG. 1. As shown in FIG. 10, the information is set to a division job list and stored into the RAM of the storage 1030 of the host in FIG. 1 (step 2100).

In the embodiment, SDsize indicative of a capacity of the spool RAM is equal to 750 kB. Now, assuming that a job for pages 1 to 7 is one job as shown in FIG. 9, since the total data size is equal to 700 kB, the spool RAM can be used without exceeding SDsize. However, if a job for pages 1 to 8 assumes one job, the total data size is equal to 780 kB and exceeds SDsize, so that the spool RAM cannot be used. Therefore, the first job (division job No. 1) is set to data 700 kB of pages 1 to 7.

When a job within a range from page 8 to page 10 as a last page assumes one job as shown in FIG. 9, the total data size is equal to 300 kB and does not exceed SDsize and the spool RAM can be used. Therefore, the second job (division job No. 2) is set to data 300 kB of pages 8 to 10. In correspondence to the division job numbers, job names are labelled as JOB-01 and JOB-02, respectively.

The controller 1010 of the host sets the last value of the division job number indicative of the number of divided jobs into JLnum and stores it into the RAM of the storage 1030 of the host (step 2110). Since the job is divided into two jobs here, the division job number is equal to 2 and JLnum=2.

Subsequently, the controller 1010 of the host makes a list of the designated number of copies (FIG. 11) as information indicative of the designated number of copies which is used for each of the divided jobs on the basis of the information of the division job list stored in the RAM of the storage 1030 of the host in FIG. 1 and stores it into the RAM of the storage 1030 of the host in FIG. 1 (step 2120).

Figure 11:
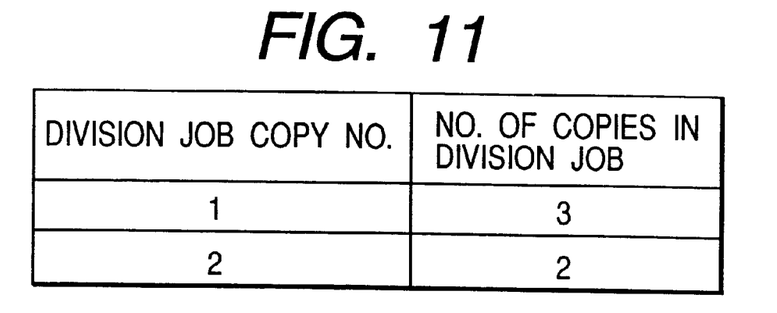
FIG. 11 is a table showing a list of division job designated number of copies which is formed in the first embodiment of the invention.

In this case, since the maximum designated number of copies which can be printed in a lump is equal to the number of sheet ejection ports, if the number of copies exceeding the number of sheet ejection ports is designated, the copies of the designated number cannot be printed in a lump. Therefore, the number of copies is divided into a plurality of numbers of copies and the printing of the number of copies corresponding to the number of sheet ejection ports is repeated. After that, the next number of copies are printed, so that all of the designated number of copies are finally printed. Since Bnum indicative of the designated number of copies of the data is equal to 5 and Onum showing the number of sheet ejection ports is equal to 3 here, in order to print five copies by the printer having three sheet ejection ports, a result obtained by dividing Bnum by Onum is equal to 1 and a remainder is equal to 2. Therefore, the controller 1010 determines that it is necessary to print three copies once and two copies once, thereby forming a division job list as shown in FIG. 11.

The controller 1010 of the host sets the last value of the division job copy number showing the number of the designated number of copies list into BLnum and stores it into the RAM of the storage 1030 of the host (step 2130). Since the designated number of copies are separately printed twice here, BLnum=2 from the division job copy number 2.

Subsequently, the controller 1010 of the host sets "1" as an initial value to Bnow to store the number of the designated number of copies showing the processing target (step 3010) and sets "1" as an initial value into Jnow to store the division job number indicative of the processing target (step 3020).

The controller 1010 of the host subsequently designates the Bnow-th number of copies in the designated copy number list and prints the Jnow-th job in the division job list (step 3030). Since Jnow=1 and Bnow=1 here, "3" as a value of the division job copy number 1 in the designated copy number list shown in FIG. 11 is designated as the number of copies, and the data of the job name "JOB-01" of the division job No. 1 in the division job list shown in FIG. 10 is printed.

That is, with respect to the first job (pages 1 to 7), the designated number of copies of three copies are printed.

Therefore, the controller 1010 of the host obtains the data of pages 1 to 7 from the data stored in the disk device of the storage 1030 of the host in FIG. 1, adds information indicative of the printing of three copies to those data, and transfers the resultant data to the controller 2001 of the printer via the connection 1020 of the host and the connection 2002 of the printer.

Figure 6:
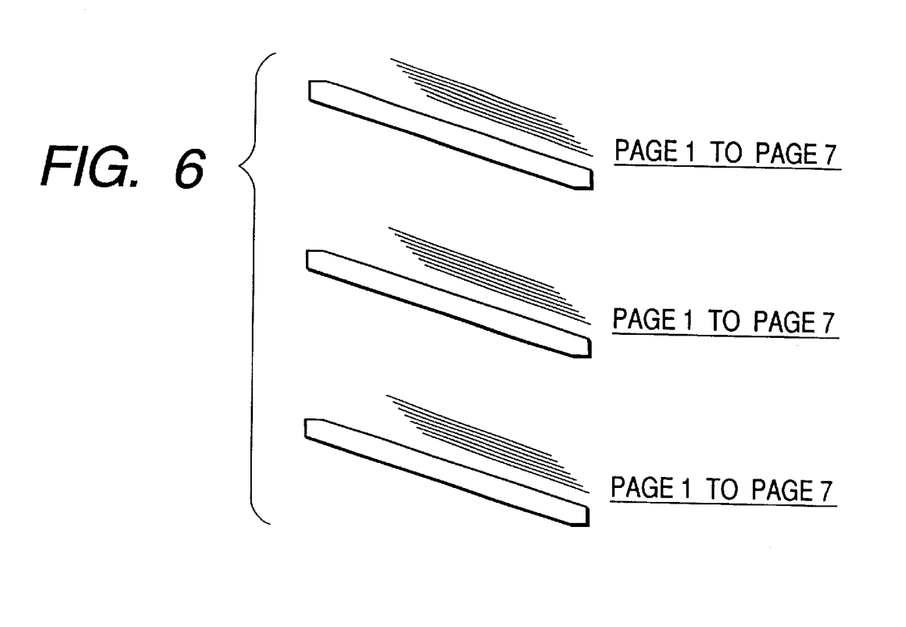
FIG. 6 is an explanatory diagram showing an output state of a print document at a time point when the first division job is outputted.

The controller 2001 of the printer analyzes the information received from the controller 1010 of the host and stores the data of pages 1 to 7 into the spool RAM set in the RAM of the storage of the printer. The controller 2001 of the printer outputs the data of pages 1 to 7 to the first sheet ejection port (FIG. 5) in the sheet ejector 2005 shown in FIG. 1 through the printer engine 2004 by using the data stored in the spool RAM, and outputs the data of pages 1 to 7 to the second sheet ejection port (FIG. 5), and subsequently outputs the data of pages 1 to 7 to the third sheet ejection port (FIG. 5). An output at this time point is in a state shown in FIG. 6.

The controller 1010 of the host subsequently discriminates whether Jnow is equal to JLnum or not (step 3040). Since Jnow=1 and JLnum=2 here, the controller 1010 of the host decides that they are not equal. Therefore, the controller 1010 adds "1" to Jnow and stores a resultant value into the disk device of the storage 1030 of the host in FIG. 1 (step 3050). The processing routine is returned to step 3030.

The controller 1010 of the host subsequently designates the number of copies Bnow in the copy number list and print the Jnow-th job in the division job list (step 3030). Since Jnow=2 and Bnow=1 here, "3" as a value of the division job copy number 1 in the designated copy number list shown in FIG. 11 is designated as the number of copies, and the data of the job name "JOB-02" of the division job No. 2 in the division job list shown in FIG. 10 is printed.

That is, the controller 1010 of the host obtains the data of pages 8 to 10 from the data stored in the disk device of the storage 1030 of the host in FIG. 1, adds information showing the printing of three copies to those data, and transfers the resultant data to the controller 2001 of the printer via the connection 1020 of the host and the connection 2002 of the printer.

Figure 7:
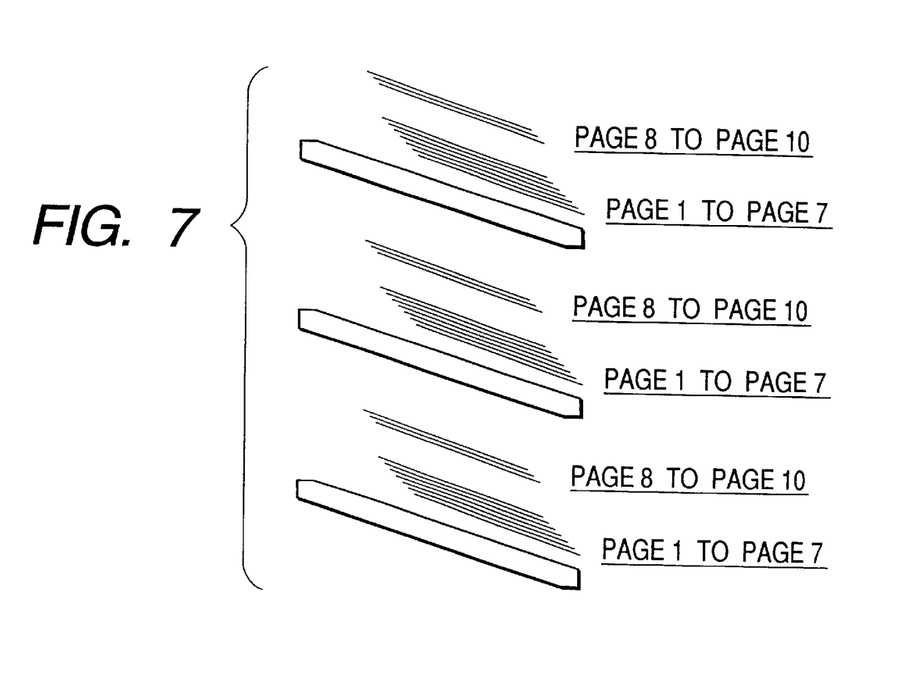
FIG. 7 is an explanatory diagram showing a state of a print document at a time point when the last division job is outputted.

The controller 2001 of the printer analyzes the information received from the controller 1010 of the host and stores the data of pages 8 to 10 into the spool RAM. The controller 2001 of the printer outputs the data of pages 8 to 10 to the first sheet ejection port (FIG. 5) in the sheet ejector 2005 shown in FIG. 1 by using the data stored in the spool RAM, outputs the data of pages 8 to 10 to the second sheet ejection port, and subsequently outputs the data of pages 8 to 10 to the third sheet ejection port. At this time point, the sheet ejector becomes a state as shown in FIG. 7 and three copies of the print data of pages 1 to 10 have been outputted.

The controller 1010 of the host discriminates whether Jnow is equal to JLnum or not (step 3040). Since Jnow=2 and JLnum=2 here, the controller 1010 decides that they are equal.

A check is now made to see if Bnow is equal to BLnum (step 3060). Since Bnow=1 and BLnum=2 here, the controller 1010 of the host determines that they are not equal. The controller 1010 adds "1" to Bnow and stores a resultant value into the storage 1030 of the host in FIG. 1 (step 3070). The processing routine is returned to step 3020 and "1" as an initial value is set into Jnow.

Subsequently, the controller 1010 of the host designates the Bnow-th number of copies in the designated copy number list and print the Jnow-th job in the division job list (step 3030). Since Jnow=1 and Bnow=2 here, "2" as a value of the division job copy number 2 in the designated copy number list shown in FIG. 11 is designated as the number of copies, and the data of the job name "JOB-01" of the division job No. 1 in the division job list shown in FIG. 10 is printed.

The controller 1010 of the host obtains the data of pages 1 to 7 from the data stored in the disk device of the storage 1030 of the host in FIG. 1, adds information showing the printing of two copies to those data, and transfers the resultant data to the controller 2001 of the printer via the connection 1020 of the host and the connection 2002 of the printer.

The controller 2001 of the printer analyzes the information received from the controller 1010 of the host and stores the data of pages 1 to 7 into the spool RAM. The controller 2001 of the printer outputs the data of pages 1 to 7 to the first sheet ejection port (FIG. 5) in the sheet ejector 2005 shown in FIG. 1 by using the data stored in the spool RAM and subsequently outputs the data of pages 1 to 7 to the second sheet ejection port (FIG. 5) in the sheet ejector 2005.

The controller 1010 of the host discriminates whether Jnow is equal to JLnum or not (step 3040). Since Jnow=1 and JLnum=2 here, the controller 1010 of the host decides that they are not equal. The controller adds "1" to Jnow and stores a resultant value into the disk device of the storage 1030 of the host in FIG. 1 (step 3050). The processing routine is returned to step 3030.

Subsequently, the controller 1010 of the host designates the Bnow-th number of copies in the copy number list and print the Jnow-th job in the division job list (step 3030). Since Jnow=2 and Bnow=2 here, "2" as a value of the division job copy number 2 in the designated copy number list shown in FIG. 11 is designated as the number of copies, and the data of the job name "JOB-02" of the division job No. 2 in the division job list shown in FIG. 10 is printed.

The controller 1010 of the host obtains the data of pages 8 to 10 from the data stored in the disk device of the storage 1030 of the host in FIG. 1, adds information indicative of the printing of two copies to those data, and transfers the resultant data to the controller 2001 of the printer via the connection 1020 of the host and the connection 2002 of the printer.

Figure 8:
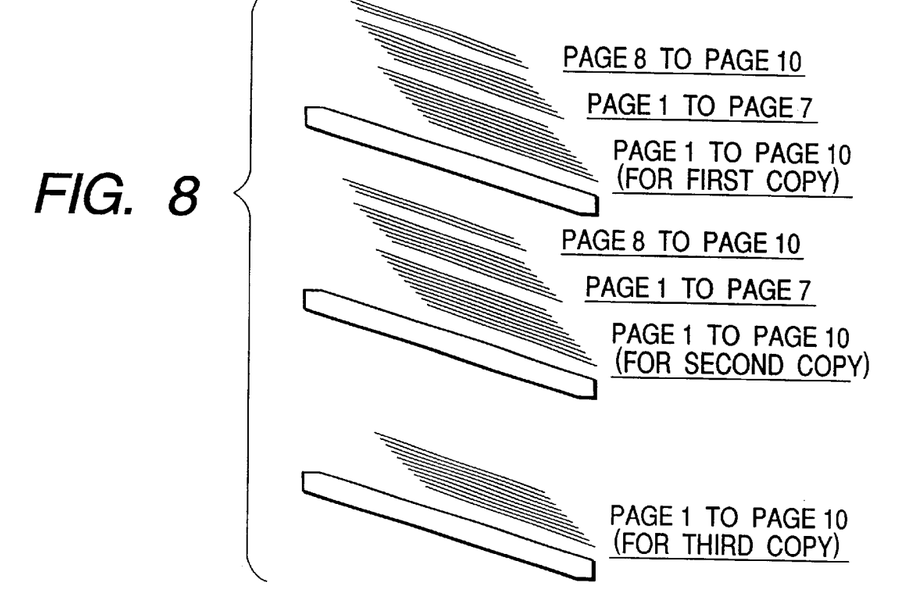
FIG. 8 is an explanatory diagram showing a state of a print document at a time point when all of the division jobs with respect to all of the designated number of copies are outputted.

The controller 2001 of the printer analyzes the information received from the controller 1010 of the host and stores the data of pages 8 to 10 into the spool RAM. The controller 2001 of the printer outputs the data of pages 8 to 10 to the first sheet ejection port (FIG. 5) in the sheet ejector 2005 in FIG. 1 by using the data stored in the spool RAM and subsequently outputs the data of pages 8 to 10 to the second sheet ejection port (FIG. 5) of the sheet ejector 2005. At this time point, the output of two copies is completed, the sheet ejector becomes a state as shown in FIG. 8, and five copies of the data of pages 1 to 10 have been outputted as a whole.

The controller 1010 of the host subsequently discriminates whether Jnow is equal to JLnum or not (step 3040). Since Jnow=2 and JLnum=2 here, the controller 1010 decides that they are equal.

A check is made to see if Bnow is equal to BLnum or not (step 3060). Since Bnow=2 and BLnum=2 here, the controller 1010 of the host decides that they are equal. The printing process is finished.

To print five copies of the data in the embodiment by the conventional technique, since the data is larger than the capacity of the spool device, the data of 1 MB (partial data)×5 (times)=5 MB has to be transferred.

Figure 12:
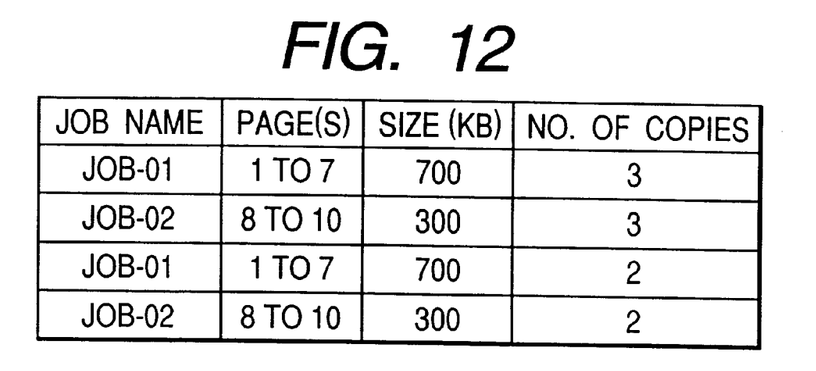
FIG. 12 is a table showing a data transfer in case of executing the printing process in the first embodiment of the invention.

However, in case of applying the invention, as shown in FIG. 12, it is sufficient to transfer the data of 700 kB (as much as pages 1 to 7)×2 (times)+300 kB (as much as pages 8 to 10)×2 (times)=2 MB. Consequently, the data transfer amount can be reduced into ⅖ and the printing speed can be remarkably improved as compared with that in the conventional technique.

[Second Embodiment]

By further improving the method of making the division job list in step 2100 and the method of making the designated copy number list in step 2120 in the above first embodiment, a binding function can be added. The binding function is a process to bind sheets on a copy unit basis by using a needle or the like.

According to the conventional printing method, since all of the pages are printed with respect to each copy, the binding process can be performed at a time point when the printing of all pages is finished. Specifically speaking, after the print data with respect to each page was analyzed for pages 1 to 10, the printing process is performed and, further, the binding process is executed. By repeating the above processes five times, five copies of the document which was subjected to the binding process can be formed. As mentioned above, however, according to this print processing method, it takes a long print processing time and it is not efficient.

In the first embodiment, since the printing process of pages 1 to 7 and the printing process of pages 8 to 10 are separately performed, the binding process cannot be executed in this state. That is, in the first embodiment, if the binding process is instructed simultaneously with the printing process, the binding process is performed after pages 1 to 7 were printed and, further, the binding process is also executed after pages 8 to 10 were printed. There is, consequently, an inconvenience such that the sheets are bound every print job with respect to one print document.

To prevent such a drawback, by improving the method of making the division job list (step 2100) and the method of making the designated copy number list (step 2120), as will be explained hereinlater, the binding function can be added. The other processes are executed by a procedure similar to that of the first embodiment.

Figure 13:
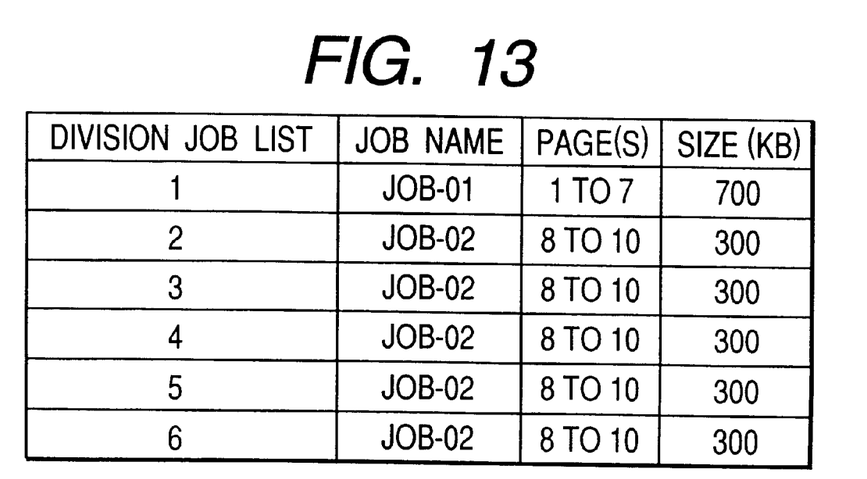
FIG. 13 is a table showing a division job list which is formed in the second embodiment of the invention.
Figure 14:
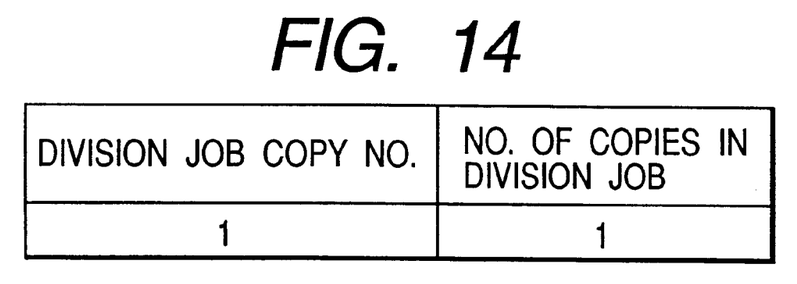
FIG. 14 is a table showing a list of division job designated number of copies which is formed in the second embodiment of the invention.

The controller 1010 of the host makes a division job list as shown in FIG. 13 in step 2100 of the first embodiment and makes a designated copy number list as shown in FIG. 14 in step 2120. The controller 1010 of the host issues a command for storing the data (pages 1 to 7) of JOB-01 of the division job No. 1 into the spool device, printing it, and thereafter, storing the data of OB-01 of the division job No. 1 into the spool device to the controller 2001 of the printer. The controller 2001 of the printer executes this command.

Subsequently, the controller 1010 of the host issues a command for printing the data (pages 8 to 10) of JOB-02 of the division job No. 2 without storing into the spool device to the controller 2001 of the printer. The controller 2001 of the printer executes this command. At this time, if the binding process is necessary, the controller 1010 of the host adds a command for performing the binding process after the data of JOB-02 of the division job No. 2 was printed. The controller 2001 of the printer executes the process.

The controller 1010 of the host issues a command for printing the data of JOB-01 of the division job No. 1 stored in the spool device prior to the data (pages 8 to 10) of JOB-02 of the division job No. 3 and, thereafter, printing the data of JOB-02 of the division job No. 3 to the controller 2001 of the printer. The controller 2001 of the printer executes this command. In this instance, if the binding process is necessary, the controller 1010 of the host adds a command for executing the binding process after the data of JOB-02 of the division job No. 3 was printed. The controller 2001 of the printer executes the process.

After that, a process similar to JOB-02 of the division job No. 3 is repeated also with respect to the data from the data of JOB-02 of the division job No. 4 to the data of JOB-02 of the division job No. 6, so that the document of five copies which was subjected to the binding process can be formed.

Figure 15:
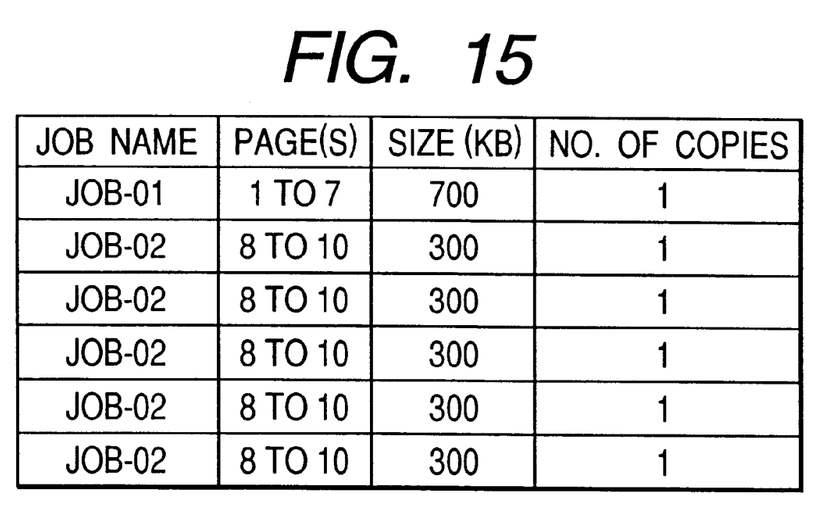
FIG. 15 is a table showing a data transfer in case of executing the printing process in the second embodiment of the invention.

In case of using the second embodiment of the invention, as shown in FIG. 15, it is sufficient to transfer the data of 700 kB (as much as pages 1 to 7)×1 (time)+300 kB (as much as pages 8 to 10)×5 (times)=2.2 MB. Consequently, the data transfer amount can be reduced into $2\cdot2/5$ and the printing speed can be improved as compared with that in the conventional technique.

[Other Embodiments]

Although the RAM has been shown as an example of the spool device in the above embodiments, the invention can be also applied to any other various memory devices, a magnetic disk device, a magnetooptic disk device, and a magnetic tape device.

Although the printing process in the system of the host computer and the printer has been shown in each of the embodiments, the invention can be also applied to single equipment.

The printer can be also realized by a printer of a plotter, a copying apparatus, a facsimile, or the like.

Further, the host computer can be also realized by a personal computer, a work station, a minicomputer, or the like.

The controller can be also realized by software, an ROM, an RAM, or the like.

The connection can be also realized by a serial interface board, a parallel interface board, a network interface board, or the like.

The storage can be also realized by a memory, a magnetic disk device, a magnetooptic disk device, a magnetic tape device, or the like.

The printer engine can be also realized by a laser beam system, a bubble jet system, an LED system, a thermal transfer system, or the like.

The sheet ejector can be also realized by a finisher, a sorter, or the like.

As will be obviously understood from the above description, in the invention, when the print data exceeds the memory capacity of the spool device, the print data is divided into a plurality of print jobs on a page unit basis so that it can lie within the memory capacity and is printed. Therefore, even if the print data exceeds the capacity of the spool device, the copies of the print data can be efficiently printed by using the spool device.

What is claimed is:

1. A print processing method of generating a print job and sending the print job to a printer via an interface, comprising:

a determination step of determining whether the printer can execute a print job for which printing is requested for a plurality of copies on a copy unit basis, based on device information related to the printer; and a dividing step of automatically dividing the print job into a plurality of print jobs so that the printer can execute each divided print job, if said determination step determines that the printer cannot execute the print job.

2. A method according to claim 1, wherein said dividing step divides the print job into the plurality of print jobs by a page unit, if the print job has a data size larger than a storage capacity of a spool device of the printer.

3. A print processing method of generating a print job and sending the print job to a printer via an interface, comprising:

a determination step of determining whether the printer can execute a print job for which printing is requested for a plurality of copies on a copy unit basis, based on device information related to the printer; and a dividing step of automatically dividing the print job into a plurality of print jobs so that the printer can execute each divided print job, if said determination step determines that the printer cannot execute the print job, wherein if printing is requested for a number of copies larger than a number of the sheet ejection ports of the printer, said dividing step divides the print job into the plurality of print jobs having respective smaller numbers of copies calculated based on the number of sheet ejection ports.

4. A print processing method of generating a print job and sending the print job to a printer via an interface, comprising:

a determination step of determining whether the printer can execute a print job for which printing is requested for a plurality of copies on a copy unit basis, based on device information related to the printer; and a dividing step of automatically dividing the print job into a plurality of print jobs so that the printer can execute each divided print job, if said determination step determines that the printer cannot execute the print job, wherein if printing is requested for a number of copies larger than a number of sheet ejection ports of the printer, said dividing step divides the print job into the plurality of print jobs having respective smaller numbers of copies calculated based on the number of sheet ejection ports.

5. A print processing method of generating a print job and sending the print job to a printer via an interface, comprising:

a determination step of determining whether the printer can execute a print job for which printing is requested for a plurality of copies on a copy unit basis, based on device information related to the printer; and a dividing step of automatically dividing the print job into a plurality of print jobs so that the printer can execute each divided print job, if said determination step determines that the printer cannot execute the print job, wherein binding is designated for the print job.

6. A print processing apparatus for generating a print job and sending the print job to a printer via an interface, comprising:

determination means for determining whether the printer can execute a print job for which printing is requested for a plurality of copies on a copy unit basis, based on device information related to the printer; and dividing means for automatically dividing the print job into a plurality of print jobs so that the printer can execute each divided print job, if said determination means determines that the printer cannot execute the print job.

7. An apparatus according to claim 6, wherein said dividing means divides the print job into the plurality of print jobs by a page unit, if the print job has a data size larger than a storage capacity of a spool device of the printer.

8. A print processing apparatus for generating a print job and sending the print job to a printer via an interface, comprising:

determination means for determining whether the printer can execute a print job for which printing is requested for a plurality of copies on a copy unit basis, based on device information related to the printer; and dividing means for automatically dividing the print job into a plurality of print jobs so that the printer can execute each divided print job, if said determination means determines that the printer cannot execute the print job, wherein if printing is requested for a number of copies larger than a number of sheet ejection ports of the printer, said dividing means divides the print job into the plurality of print jobs having respective smaller numbers of copies calculated based on the number of sheet ejection ports.

9. A print processing apparatus for generating a print job and sending the print job to a printer via an interface, comprising:

determination means for determining whether the printer can execute a print job for which printing is requested for a plurality of copies on a copy unit basis, based on device information related to the printer; and dividing means for automatically dividing the print job into a plurality of print jobs so that the printer can execute each divided print job, if said determination means determines that the printer cannot execute the print job, wherein if printing is requested for a number of copies larger than a number of sheet ejection ports of the printer, said dividing means divides the print job into the plurality of print jobs having respective smaller numbers of copies calculated based on the number of sheet ejection ports.

10. A print processing apparatus for generating a print job and sending the print job to a printer via an interface, comprising:

determination means for determining whether the printer can execute a print job for which printing is requested for a plurality of copies on a copy unit basis, based on device information related to the printer; and dividing means for automatically dividing the print job into a plurality of print jobs so that the printer can execute each divided print job, if said determination means determines that the printer cannot execute the print job, wherein binding is designated for the print job.

11. A computer-readable storage medium for storing program codes implemented by a host computer which generates a print job and sends the print job to a printer via an interface, said program codes comprising:

a determination step of determining whether the printer can execute a print job for which printing is requested for a plurality of copies on a copy unit basis, based on device information related to the printer; and a dividing step of dividing the print job into a plurality of print jobs so that the printer can execute each divided print job, if said determination step determines that the printer cannot execute the print job.

12. A medium according to claim 11, wherein said dividing means divides the print job into the plurality of print jobs by a page unit, if the print job has a data size larger than a storage capacity of a spool device of the printer.

13. A medium according to claim 11, wherein if printing is requested for a number of copies larger than a number of sheet ejection ports of the printer, said dividing step divides the print job into the plurality of print jobs having respective smaller numbers of copies calculated based on the number of sheet ejection ports.

14. A medium according to claim 12, wherein if printing is requested for a number of copies larger than a number of sheet ejection ports of the printer, said dividing step divides the print job into the plurality of print jobs having respective smaller numbers of copies calculated based on the number of sheet ejection ports.

15. A medium according to claim 14, wherein binding is designated for the print job.

16. Computer-executable process steps stored in a computer readable medium, said storage medium for storing program codes implemented by a host computer which generates a print job and sends the print job to a printer via an interface, said computer-executable process steps comprising process steps executable to perform a method according to any of claims 11–15.

17. A printing device for generating a print job and sending the print job to a printer via an interface, comprising:

a memory for storing the generated print job; and a processor for determining whether the printer can execute a print job for which printing is requested for a plurality of copies on a copy unit basis, based on device information related to the printer, wherein said processor automatically divides the print job into a plurality of print jobs so that the printer can execute each divided print job, if said processor determines that the printer cannot execute the print job.

18. A device according to claim 17, wherein said divider divides the print job into the plurality of print jobs by a page unit, if the print job has a data size larger than a storage capacity of a spool device of the printer.

19. A printing device for generating a print job and sending the print job to a printer via an interface, comprising:

a memory for storing the generated print job; and a processor for determining whether the printer can execute a print job for which printing is requested for a plurality of copies on a copy unit basis, based on device information related to the printer, wherein said processor automatically divides the print job into a plurality of print jobs so that the printer can execute each divided print job, if said processor determines that the printer cannot execute the print job, wherein if printing is requested for a number of copies larger than a number of sheet ejection ports of the printer, said divider divides the print job into the plurality of print jobs having respective smaller numbers of copies calculated based on the number of sheet ejection ports.

20. A printing device for generating a print job and sending the print job to a printer via an interface, comprising:

a memory for storing the generated print job; and a processor for determining whether the printer can execute a print job for which printing is requested for a plurality of copies on a copy unit basis, based on device information related to the printer, wherein said processor automatically divides the print job into a plurality of print jobs so that the printer can execute each divided print job, if said processor determines that the printer cannot execute the print job, wherein if printing is requested for a number of copies larger than a number of sheet ejection ports of the printer, said divider divides the print job into the plurality of print jobs having respective smaller numbers of copies calculated based on the number of sheet ejection ports.

21. A printing device for generating a print job and sending the print job to a printer via an interface, comprising:

a memory for storing the generated print job; and a processor for determining whether the printer can execute a print job for which printing is requested for a plurality of copies on a copy unit basis, based on device information related to the printer, wherein said processor automatically divides the print job into a plurality of print jobs so that the printer can execute each divided print job, if said processor determines that the printer cannot execute the print job, wherein binding is designated for the print job.

* * * * *

UNITED STATES PATENT AND TRADEMARK OFFICE
CERTIFICATE OF CORRECTION

PATENT NO. : 6,293,714 B2
DATED : September 25, 2001
INVENTOR(S) : Akihiko Noda

It is certified that error appears in the above-identified patent and that said Letters Patent is hereby corrected as shown below:

Column 1,
Line 33, "of total" should read -- total of --; and
Line 34, "a printing time" should read -- a large amount of printing time -- and "an" should read -- the --.

Column 2,
Line 20, "are" should read -- is --.

Signed and Sealed this

Sixth Day of August, 2002

Attest:

JAMES E. ROGAN
Attesting Officer           Director of the United States Patent and Trademark Office